3,321,469
COMPOUNDS OF PHENYLAZEPINES AND BENZO-
DIAZEPINE ESTERS OF POLYCARBOXYLIC
ACIDS
Sidney S. Walkenstein, Newtown Square, Pa., assignor to
American Home Products Corporation, New York,
N.Y., a corporation of Delaware
No Drawing. Filed Aug. 13, 1965, Ser. No. 479,613
3 Claims. (Cl. 260—239.3)

This invention relates to novel acid compounds of phenylazepines and benzodiazepine esters of polycarboxylic acids.

The claimed compounds are readily injectable and reduce the anxiety associated with pain.

The claimed compounds can be represented by the following formula:

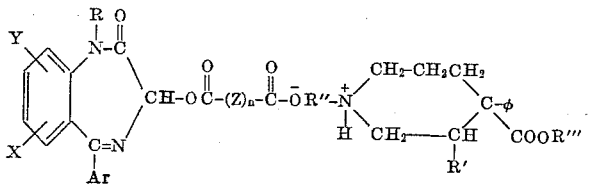

wherein X and Y may be the same or different and can be hydrogen; chlorine, bromine, nitro, trifluoromethyl and methylsulfonyl; Ar is phenyl, 2-thienyl or phenyl bearing a chlorine, fluorine, methoxy, methyl or trifluoromethyl substituent; R and R' are hydrogen or methyl; Z is alkylene where $n$ represents the number of carbon atoms and ranges from 1 to 8, or phenylene; R'' and R''' are lower alkyl.

Similar compounds in which benzodiazepine anions have two free carboxyl groups resulting in a salt which may have one or two azepine cations are equivalent to the compounds specifically claimed herein.

The claimed compounds can be prepared as shown below:

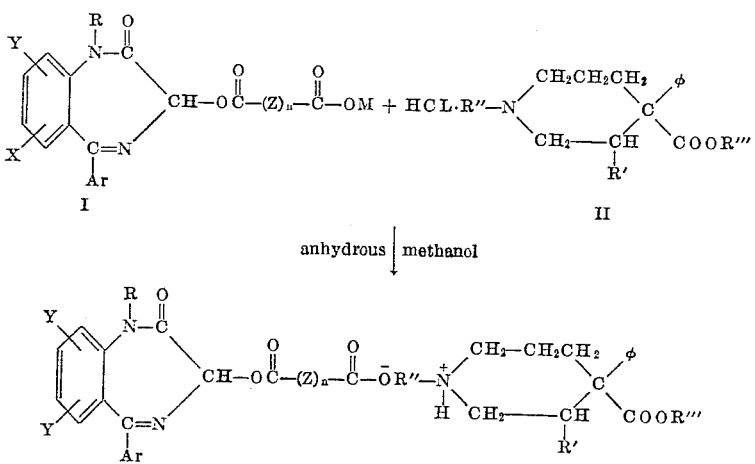

where M is sodium, potassium, rubidium, cesium, ammonium, alkyl ammonium or pyridinium.

As shown above, the claimed compounds can be prepared under anhydrous conditions by dissolving a 1,3-dihydro - 5 - aryl - 3 - carboxyacyloxy - 2H - 1,4 - benzodiazepine-2-one (I) in anhydrous methanol and adding to the resulting solution an equimolar amount of a solution of the hydrochloride or hydrobromide of a hexa-hydro-4-phenylazepine-4-carboxylic acid ester (II) in anhydrous ethanol. The resulting reaction mixture is diluted with anhydrous alcohol, stirred and allowed to stand to allow the resulting inorganic salt to settle. This salt is filtered off and the filtrate is diluted with ether and cooled at 5° C. to precipitate the product which can be purified by washing with acetone and ether.

The starting 3-carboxy acyloxy-2H-1,4-benzodiazepine-2-one (I) can be prepared as disclosed and claimed in the copending application of S. Bell, Ser. No. 447,564, filed Apr. 12, 1965, while the 4-phenylazepines (II) are prepared as disclosed in U.S. Patent 2,666,050, granted to Diamond et al.

The following examples further illustrate the practice of the invention:

EXAMPLE 1

Salt of hexahydro-1,3-dimethyl-4-phenylazepine-4-carboxylic acid, ethyl ester, 7-chloro-1,3-dihydro-3-hydroxy-5-phenyl-2H,1,4-benzodiazepine-2-one, hydrogen succinate ester 0.1 mole (40.85 g.) sodium salt of 7-chloro-1,3-dihydro - 3 - hydroxy - 5 - phenyl - 2H - 1,4 - benzodiazepine-2-one, hydrogen succinate ester was dissolved with stirring in 400 ml. anhydrous methanol. To this was added a solution of 0.1 mole (31.25 g,) of hexahydro-1,3-dimethyl-4-phenylazepine-4-carboxylic acid, ethyl ester hydrochloride in 370 ml. absolute ethanol. To this mixture was added 400 ml. anhydrous ether with stirring. After standing two hours to allow for settling of sodium chloride, the solution was filtered and one liter of ether was added in 250 ml. portions to the filtrate in a beaker, allowing for precipitate to settle before each portion was added. The beaker was covered and allowed to stand overnight in a cold room at 5° C. The supernatant was decanted and the slurry of the crystals collected on a filter and washed with acetone and ether, and dried. Melting point 173–174° C.

EXAMPLE 2

Salt of hexahydro-1-methyl-4-phenylazepine-4-carboxylic acid, ethyl ester, 7 - chloro - 1,3 - dihydro-3-hydroxy-5-phenyl - 2H - 1,4-benzodiazepine-2-one, hydrogen succinate ester When 0.1 mole of hexahydro - 1 - methyl - 4 - phenyl-azepine-4-carboxylic acid, hydrochloride, was reacted with 0.1 mole sodium salt of 7-chloro-1,3-dihydro-3-hydroxy-5-phenyl-2H-1,4-benzodiazepine-2-one, hydrogen succinate ester according to the procedure of Example 1, 0.75 mole of title compound were obtained.

The following compounds which also fall within the contemplated scope of the invention can be made by the procedure disclosed hereinabove:

| Starting Materials | Products |
|---|---|
| 7-chloro-1,3-dihydro-5-phenyl-3-hydroxy-2H-1,4-benzodiazepin-2-one, hemiphthalate ester, potassium salt, and hexahydro-1-methyl-4-phenylazepine-4-propionyl ester, hydrochloride. | Salt of hexahydro-1-methyl-4-phenylazepine-4-propionyl ester 7-chloro-1,3-dihydro-5-phenyl-3-hydroxy-2H-1,4-benzodiazepin-2-one hemiphthalate ester. |
| 7-chloro-1,3-dihydro-3-hydroxy-5-phenyl-2H-1,4-benzodiazepin-2-one, diethlammonium salt, hemiadipate ester and hexahydro-1-methyl-4-phenylazepine-4-propionyl ester hydrobromide. | Salt of hexahydro-1-methyl-4-phenylazepine-4-propionyl ester 7-chloro-1,3-dihydro-5-phenyl-2H-1,4-benzodiazepin-2-one hemiadipate ester. |
| 7-chloro-1,3-dihydro-3-hydroxy-1-methyl-5-phenyl-2H-1,4-benzodiazepin-2-one, hemisuccinate ester, sodium salt and hexahydro-1-methyl-4-butyryl-4-phenylazepine hydrobromide. | Salt of hexahydro-1-methyl-4-phenyl-4-butyryl ester, 7-chloro-1,3-dihydro-3-hydroxy-1-methyl-5-phenyl-2H-1,4-benzodiazepin-2-one hemisuccinate ester. |
| 7-chloro-5-o-chlorophenyl-1,3-dihydro-3-hydroxy-2H-1,4-benzodiazepin-2-one, hemisuccinate ester, pyridinium salt and hexahydro-1-methyl-4-propionyl-4-phenylazepine hydrochloride. | Salt of hexahydro-1-methyl-4-phenyl-4-propionyl ester, 7-chloro-5-o-chlorophenyl-1,3-dihydro-3-hydroxy-2H-1,4-benzodiazepin-2-one hemisuccinate ester. |

What is claimed is:
1. A compound of the formula:

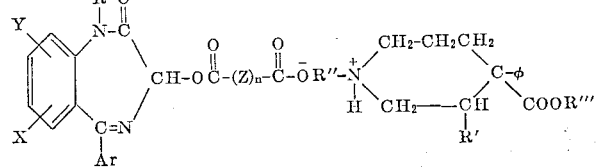

wherein X and Y may be the same or different and can be hydrogen; chlorine, bromine, nitro, trifluoromethyl and methylsulfonyl; Ar is phenyl, 2-thienyl or phenyl bearing a chlorine, fluorine, methoxy, methyl or trifluoromethyl substituent; R and R' are hydrogen or methyl; Z is alkylene where $n$ represents the number of carbon atoms and ranges from 1 to 8, or phenylene; R'' and R''' are lower alkyl.

2. The salt of hexahydro-1,3-dimethyl-4-phenylazepine-4-carboxylic acid, ethyl ester, 7-chloro-1,3-dihydro-3-hydroxy-5-phenyl-2H-1,4-benzodiazepine-2-one, hydrogen succinate ester.

3. The salt of hexahydro-1-methyl-4-phenylazepine-4-carboxylic acid, ethyl ester, 7-chloro-1,3-dihydro-3-hydroxy-5-phenyl-2H-1,4-benzodiazepine-2-one, hydrogen succinate ester.

No references cited.

WALTER A. MODANCE, *Primary Examiner.*

ROBERT T. BOND, *Assistant Examiner.*